United States Patent [19]

Stepp

[11] 3,963,743

[45] June 15, 1976

[54] METHOD OF CONDITIONING PHTHALOCYANINE PIGMENTS AND PRODUCT THEREOF

[75] Inventor: James Dial Stepp, Holland, Mich.

[73] Assignee: Chemetron Corporation, Chicago, Ill.

[22] Filed: Oct. 1, 1973

[21] Appl. No.: 402,094

[52] U.S. Cl. ............................................. 260/314.5
[51] Int. Cl.² .......................................... C09B 47/02
[58] Field of Search ................................ 260/314.5

[56] References Cited
UNITED STATES PATENTS

| 2,402,167 | 6/1946 | Lang et al. ............... 260/314.5 |
|---|---|---|
| 2,524,672 | 10/1950 | Lecher et al. ............ 260/314.5 |
| 2,716,649 | 8/1955 | Brouillard ................. 260/314.5 |
| 2,765,318 | 10/1956 | Gross ........................ 260/314.5 |
| 2,765,319 | 10/1956 | Barnhart .................... 260/314.5 |
| 2,799,595 | 7/1957 | Kudzin ...................... 260/314.5 |
| 2,833,782 | 5/1958 | Stryker et al. ............. 260/314.5 |
| 2,840,568 | 6/1958 | Brouillard et al. ......... 260/314.5 |
| 2,964,531 | 12/1960 | Kirby et al. ................ 260/314.5 |
| 3,080,375 | 3/1963 | Katz ........................... 260/314.5 |
| 3,370,065 | 2/1968 | Nold et al. ................. 260/314.5 |

*Primary Examiner*—Harry I. Moatz
*Attorney, Agent, or Firm*—N. M. Esser

[57] ABSTRACT

A strong, clean phthalocyanine pigment is prepared by conditioning the crude pigment with 4-sulfophthalic acid or the anhydride thereof.

12 Claims, No Drawings

METHOD OF CONDITIONING PHTHALOCYANINE PIGMENTS AND PRODUCT THEREOF

This invention relates to a process for conditioning phthalocyanine pigments and more particularly to an acid pasting procedure which produces phthalocyanine pigments having improved properties.

Strong, clean, transparent phthalocyanine pigments with excellent hue are important in paints, lacquers, plastics, elastomers, inks and the like. Proper conditioning of the crude pigment is essential to the realization of such important properties. The conventional method of conditioning phthalocyanine pigments by acid pasting involves the use of large volumes of corrosive acids such as sulfuric, chlorosulfonic, and the like. The use of such acids poses problems in industrial hygiene and safety during the disposal thereof.

The milling of a mixture of a phthalocyanine and an amount of such an acid just sufficient to produce a doughy, kneadable mass is taught in U.S. Pat. No. 2,716,649 as a means of avoiding the problems encountered in the older acid pasting methods. The pigments produced by this milling method do not always have the transparency required for certain purposes such as the production of irridescent paints.

The use of dicarboxylic acids and anhydrides, such as phthalic anhydride, to protect the pigment from the effects of strong sulfuric acid at high temperatures is taught in U.S. Pat. No. 2,964,531. That process, however, still uses from three to 20 parts of concentrated sulfuric acid per part of phthalocyanine and the problems inherent in the use of large quantities of sulfuric acid still remain in such a process.

There still remains, therefore, a need for a method of conditioning a phthalocyanine pigment which gives a strong, clean and transparent pigment.

Accordingly, it is an object of this invention to provide a method of conditioning phthalocyanine pigments which imparts improved pigmentary properties to the product.

An additional object is to provide a method of conditioning in which the ratio of the conditioning acid to the pigment is relatively low.

A further object is to provide strong, clean, and transparent phthalocyanine pigments.

A still further object is to provide a phthalocyanine green pigment which has a yellower shade than one conditioned with sulfuric acid.

Still further objects and the scope of applicability of the present invention will become apparent from the detailed description given hereafter; it should be understood, however, that the detailed description and specific examples, while indicating preferred embodiments of the invention, are given by way of illustration only, since various changes and modifications within the spirit and scope of the invention, as defined in the claims, will become apparent to those skilled in the art from this detailed description.

The invention is a method of conditioning a phthalocyanine pigment comprising mixing the pigment with 4-sulfophthalic acid or the anhydride thereof at a temperature of from about 50° to about 100°C. The anhydride is preferred.

The method is suitable for the conditioning of a metal phthalocyanine, such as copper, nickel, cobalt, zinc, aluminum, and lead phthalocyanines, a metal-free phthalocyanine, or a halogenated phthalocyanine, i.e., the halogenated metal-free phthalocyanine and the halogenated metal derivates. $\beta$-copper phthalocyanine is converted to the $\alpha$ form by this method. The halogenated phthalocyanines contain halogen selected from the class consisting of fluorine, chlorine, and bromine or mixtures thereof. The method of this invention is especially beneficial to halogenated phthalocyanines containing a total of from about 0.5 to about 15 atoms of at least one halogen selected from the class consisting of chlorine and bromine. Phthalocyanines containing from about 1 to about 8 chlorine atoms, such as octachlorophthalocyanine and copper dibromohexachlorophthalocyanine, and those containing from about 1 to about 8 bromine atoms, such as hexabromophthalocyanine and dibromooctachlorophthalocyanine, are exemplary.

From about 0.6 to about 6.0 parts by weight of 4-sulfophthalic acid or anhydride per part of phthalocyanine may be used in this conditioning method. A preferred ratio is from about 1:1 to about 3:1.

While the method may be carried out at any temperature within the range mentioned above, it is preferred that the pigment and 4-sulfophthalic anhydride be mixed at a temperature of from about 60° to about 90°C. and more preferably at from about 70° to about 80°C.

A mixture of 4-sulfophthalic anhydride and the pigment tends to be a viscous, gummy mass and any type of apparatus which is capable of exerting a shearing force on such a mass may be used. A kneading action, such as that obtained with a Werner-Pfleiderer type mixer, is quite satisfactory.

The mixing time is not critical and may range from as little as about 5 minutes to as much as 6 hours or more, depending upon the size of the batch, the pigment, and the temperature employed. For obvious reasons, the shortest time sufficient to effect the contemplated improvements in the properties of the pigment is preferred. A mixing period of about 3 hours is usually sufficient.

The following examples are illustrative of several preferred embodiments of the method of this invention. Parts by weight are used unless otherwise noted.

EXAMPLE I

To a double arm Baker-Perkins kneader equipped with a steam heated jacket and having a capacity of about 100 parts, there are added 10 parts of a crude copper phthalocyanine green containing 48.5% chlorine and the crude pigment is heated to 60°C. while being agitated. Agitation of the crude pigment is continued during addition of 18 parts of 4-sulfophthalic anhydride and heating of the mixture to 70°–75°C. The gummy, viscous mixture is kneaded at that temperature for 3 hours. The mixture is then discharged into 1200 parts of cold water and the resulting slurry is stirred and heated to 80°–90°C. for 1 hour and filtered. The filter cake is washed with water until a neutral wash is obtained. The moist pigment is redispersed in 1000 parts of water and the pH of the dispersion is adjusted to 11.3 by the addition of a 3% solution of sodium hydroxide. The dispersion is then heated to 80°–90°C. for one hour, filtered, and the filter cake is washed with water until neutral and then dried at 75°C. to give an improved pigment of this invention.

A printing ink prepared from the pigment conditioned by the above procedure is yellower and cleaner than one conditioned in sulfuric acid.

EXAMPLE II

A mixture of 10 parts of a crude copper phthalocyanine containing about 2 atoms of chlorine and about 8 atoms of bromine per mole and 18 parts of 4-sulfophthalic anhydride is milled as in Example I at 70°–75°C. for 3 hours. The mixture is then stirred with 1200 parts of water at 80°–90°C. for 1 hour and filtered. The filter cake is washed until neutral and then dried to give another improved pigment of this invention.

The improved properties of the green pigment of Example II are shown by a comparison of tints prepared from this pigment and from one obtained by a conditioning of the same crude pigment in 11 parts of 94% sulfuric acid according to a prior art procedure. A masstone ink is prepared from each pigment by mixing 0.5 gram of the conditioned pigment with 1.0 gram of an oleoresinous vehicle and grinding the mixture between two ground glass plates for 50 revolutions. The resulting paste is redistributed and the grinding process is repeated for a total of 6 times. A tint is made from each pigment by mixing 0.1 gram of the masstone ink with 7.0 grams of a white paste consisting of zinc oxide and the oleoresinous vehicle until a uniform color is obtained.

Side by side drawdowns of the tints are made on white bond paper and visually compared. The tint prepared from the product of Example II appears stronger than the one conditioned with sulfuric acid. A reduced tint, prepared by mixing 95% of the original tint from the product of Example II with 5% of fresh zinc oxide paste, is placed side by side on white bond paper with the original tint of the sulfuric acid conditioned pigment. The strengths are now equal and the tint from the product of Example II is much cleaner and yellower.

EXAMPLE III

A mixture of 25 parts of 4-sulfophthalic anhydride and 10 parts of a crude copper phthalocyanine containing about 4.5% chlorine (about 0.75 atom per mole) is kneaded for two hours at 70°–75°C. The pigment is isolated by slurrying the mixture in water at 80°C. for 1 hour, filtering, washing until neutral and drying. The desired bright blue pigment is obtained.

The strength of a reduced tint prepared by mixing 92 parts of the full tint of the pigment conditioned by the procedure of Example III with 8 parts of a zinc oxide paste is equal to the full tint of a commercial standard of the pigment conditioned by a conventional acid pasting procedure.

EXAMPLE IV

Copper hexadecachlorophthalocyanine, 1 part, and 2 parts of 4-sulfophthalic anhydride are kneaded at 80°C. for 2 hours. The mixture is stirred with 150 parts of water at 80°C. for 1 hour and filtered. The filter cake is washed until neutral and dried to give another improved pigment of this invention.

The same copper hexadecachlorophthalocyanine is conditioned according to the procedure of Example I of U.S. Pat. No. 2,964,531, and the product is compared with the product of Example IV. The strength of the product of the U.S. Pat. No. 2,964,531 procedure is 60% of the strength of the pigment conditioned with 4-sulfophthalic anhydride and the weaker pigment is also dirty and dull in comparison with the pigment of Example IV.

The exact function of the 4-sulfophthalic anhydride in the present process is not fully understood and the exact crystalline structure and chemical composition of the product is not fully known. The product of the conditioning process of this invention is novel, however, and is one aspect of the invention herein disclosed.

I claim:

1. A method of conditioning a phthalocyanine pigment selected from the class consisting of phthalocyanine, a metal phthalocyanine, a halogenated phthalocyanine and a halogenated metal phthalocyanine, said method consisting essentially of mixing the pigment with 4-sulfophthalic acid or anhydride at a temperature of from about 50° to about 100°C.

2. The method of claim 1 wherein the phthalocyanine contains a halogen selected from the class consisting of fluorine, chlorine, and bromine and mixtures thereof.

3. The method of claim 2 wherein the phthalocyanine pigment is a copper phthalocyanine.

4. The method of claim 1 wherein the pigment is mixed with the anhydride.

5. The method of claim 4 wherein the weight ratio of the 4-sulfophthalic anhydride to pigment is from about 0.6:1 to about 6:1.

6. The method of claim 3 wherein the phthalocyanine contains a total of from about 0.5 to about 15 atoms of at least one halogen selected from the class consisting of chlorine and bromine per mole of phthalocyanine.

7. The method of claim 6 wherein the phthalocyanine contains from about 1 to about 8 atoms of bromine per mole of phthalocyanine.

8. The method of claim 6 wherein the phthalocyanine contains from about 1 to about 8 atoms of chlorine per mole of phthalocyanine.

9. The method of claim 8 wherein the phthalocyanine contains about 2 atoms of chlorine and about 8 atoms of bromine.

10. The method of claim 1 wherein the mixing temperature is from about 60° to about 90°C.

11. The method of claim 5 wherein the ratio is from about 1:1 to about 3:1.

12. The method of claim 1 wherein the mixing is accomplished by kneading.

* * * * *